(12) United States Patent
Li et al.

(10) Patent No.: US 7,753,281 B2
(45) Date of Patent: Jul. 13, 2010

(54) SYSTEM AND METHOD OF UPDATING A FIRST VERSION OF A DATA FILE IN A CONTACTLESS FLASH MEMORY DEVICE

(75) Inventors: Jun Li, Mountain View, CA (US); Riddhiman Ghosh, Sunnyvale, CA (US); Kave Eshghi, Los Altos, CA (US); Thomas Rathbone, Wolverhampton (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 11/444,922

(22) Filed: Jun. 1, 2006

(65) Prior Publication Data

US 2007/0283078 A1 Dec. 6, 2007

(51) Int. Cl.
*G06K 19/06* (2006.01)

(52) U.S. Cl. .................... 235/492; 235/380; 235/451; 235/435; 340/572.1; 711/103; 710/13; 713/100; 717/168; 707/824

(58) Field of Classification Search ............. 340/572.1; 330/7; 711/103; 710/13; 713/100; 235/451, 235/435, 492, 380, 441; 717/168, 169; 707/203, 707/824
See application file for complete search history.

(56) References Cited

U.S. PATENT DOCUMENTS

| | | | |
|---|---|---|---|
| 6,922,734 B2 * | 7/2005 | Teicher ........................ 710/1 |
| 7,025,261 B2 | 4/2006 | Lagosanto et al. | |
| 7,228,317 B1 * | 6/2007 | Epstein et al. ............... 707/203 |
| 7,325,734 B2 * | 2/2008 | Howarth et al. ............. 235/451 |
| 7,472,254 B2 * | 12/2008 | Collins ........................ 711/220 |
| 2005/0071839 A1 * | 3/2005 | Kim et al. .................... 717/170 |
| 2005/0109841 A1 * | 5/2005 | Ryan et al. ................... 235/380 |
| 2005/0272418 A1 * | 12/2005 | Vinson et al. ................ 455/420 |
| 2006/0069814 A1 * | 3/2006 | Abraham et al. ............... 710/8 |
| 2006/0097060 A1 * | 5/2006 | Aoki et al. ................... 235/492 |
| 2006/0136899 A1 * | 6/2006 | Yoo ............................. 717/168 |
| 2006/0208066 A1 * | 9/2006 | Finn et al. .................... 235/380 |
| 2007/0046369 A1 * | 3/2007 | Schober et al. ................ 330/7 |
| 2007/0109100 A1 * | 5/2007 | Jett et al. .................... 340/10.4 |
| 2007/0170267 A1 * | 7/2007 | Kang et al. .................. 235/492 |

* cited by examiner

Primary Examiner—Hong Kim

(57) ABSTRACT

A flash memory device is powered via an RF field generated by a host unit. A contactless communication channel is established between the flash memory device and the host unit. A first version of a data file, including a first plurality of data chunks, is downloaded from the flash memory device to the host unit. A second version of the data file, including a second plurality of data chunks, is generated at the host unit. Data chunk modifications to the first plurality of data chunks necessary to generate the second plurality of data chunks are identified at the host unit. The contactless communication channel is reestablished. The identified data chunk modifications to the first plurality of data chunks are performed thereby updating the first version of the data file stored on the flash memory device to the second version of the data file.

25 Claims, 7 Drawing Sheets

| DATA FILE NAME | DATA FILE ATTRIBUTES | NO. OF DATA CHUNKS | DATA CHUNK 1 RECORD POINTER | DATA CHUNK 2 RECORD POINTER | --- | DATA CHUNK N RECORD POINTER |
|---|---|---|---|---|---|---|
| 502 | 504 | 506 | 508 | 510 | | 512 |

FIG. 5(a)

| DATA CHUNK SIZE | NO. OF DATA BLOCKS IN DATA CHUNK | DATA BLOCK 1 POINTER | DATA BLOCK 2 POINTER | ------ | DATA BLOCK N POINTER |
|---|---|---|---|---|---|
| 514 | 516 | 518 | 520 | | 522 |

FIG. 5(b)

| FILE NAME | FILE ATTRIBUTES | HASH VALUE DATA CHUNK 1 | HASH VALUE DATA CHUNK 2 | --- | HASH VALUE DATA CHUNK N |
|---|---|---|---|---|---|
| 602 | 604 | 606 | 608 | | 610 |

FIG. 6(a)

| DATA CHUNK FILE X1 | DATA CHUNK FILE X2 | ---------- | DATA CHUNK FILE XN |
|---|---|---|---|
| 612 | 614 | | 616 |

FIG. 6(b)

SYSTEM AND METHOD OF UPDATING A FIRST VERSION OF A DATA FILE IN A CONTACTLESS FLASH MEMORY DEVICE

FIELD OF THE INVENTION

The present invention generally relates to flash memory devices and more particularly to systems and methods for updating the data stored in a flash memory device via a contactless communication channel.

BACKGROUND OF THE INVENTION

Contactless flash memory devices are being used in an increasing number of applications. For example, contactless flash memory devices are often employed in credit card transactions, electronic cash transactions, computer security applications, incentive programs involving the tracking of customer loyalty, and government identification applications.

One prior art contactless memory device is a passive radio frequency identification (RFID) tag. The RFID memory tag is a read only device and includes a memory microchip coupled to an inductive antenna. The RFID memory tag is powered by an RF field that is established between an RFID reader and the RFID memory device. Once the RFID memory tag is powered, the RFID reader retrieves the data stored on the RFID memory tag via a contactless communication channel and passes the retrieved data to a host device, such as for example a computer. Since the RFID memory device is a read only device, once data is burned into an RFID memory tag, the data stored in the RFID memory tag cannot be modified or updated.

Another prior art contactless memory device is a contactless smart card. The contactless smart card is a near field communication device that includes a controller, a flash memory microchip, and an inductive antenna. The smart card flash memory microchip offers limited non-volatile and reprogrammable storage. The contactless smart card is also powered by the RF field that is established between a smart card reader/writer and the contactless smart card when the contactless smart card is positioned within range of the smart card reader/writer. The contactless smart card must also be maintained within range of the smart card reader/writer during read and/or write operations. Updating a data file stored on a smart card flash memory typically involves first erasing the entire old version of the data file and then writing the entire new version of the data file to the flash memory. While reading the data stored on a flash memory or writing to a flash memory for the first time is generally a relatively fast process, erasing data stored on a flash memory and then writing data to a flash memory can be relatively slow processes, especially when the erase and write operations involve relatively large amounts of data. Contactless communication may prove to be unreliable in the event the contactless smart card cannot be consistently maintained within range of the smart card reader/writer. For example, moving the contactless smart card out of range of the smart card reader/writer may result in loss of power to the smart card and potentially disrupt any erase and/or write operations that may be in progress thereby affecting the integrity of the data being transmitted for storage on the contactless smart card. As a result, accessing and updating multiple data files stored on a contactless smart card, especially when the updating of data files involves the erasing and writing of large amounts of data, may prove to be challenging.

Thus what is needed is a contactless flash memory device that seeks to overcome one or more of the challenges and/or obstacles described above.

SUMMARY OF THE INVENTION

One aspect of the invention provides a method of updating a data file stored on a flash memory device. The method includes powering a flash memory device via an RF field generated by a host unit. A contactless communication channel is established between the flash memory device and the host unit. A first version of a data file is downloaded from the flash memory device to the host unit via the contactless communication channel. The first version of the data file includes a first plurality of data chunks. A second version of the data file is generated at the host unit. The second version of the data file includes a second plurality of data chunks. At least one data chunk modification to the first plurality of data chunks necessary to generate the second plurality of data chunks is identified at the host unit. The contactless communication channel is reestablished between the flash memory device and the host unit responsive to the completion of the identification of the at least one data chunk modification to the first plurality of data chunks necessary to generate the second plurality of data chunks. The at least one data chunk modification to the first plurality of data chunks stored on the flash memory device is performed thereby updating the first version of the data file stored on the flash memory device to the second version of the data file.

Another aspect of the invention provides a computer readable medium storing a computer program for updating a data file stored on a flash memory device. Another aspect of the invention provides a system for updating a data file stored on a flash memory device.

BRIEF DESCRIPTION OF THE DRAWINGS

The present invention is illustrated by way of example and not limited in scope to the accompanying figures, in which like reference numerals indicate similar elements, and in which:

FIGS. 5(a)-(b) is an illustration of one embodiment of a data file storage organization scheme for storing a data file on a flash memory device in accordance with the principles of the present invention;

FIGS. 6(a)-(b) is an illustration of another embodiment of a data file storage organization scheme for storing a data file on a flash memory device in accordance with the principles of the present invention;

DETAILED DESCRIPTION OF THE PREFERRED EMBODIMENTS

Figure 1:
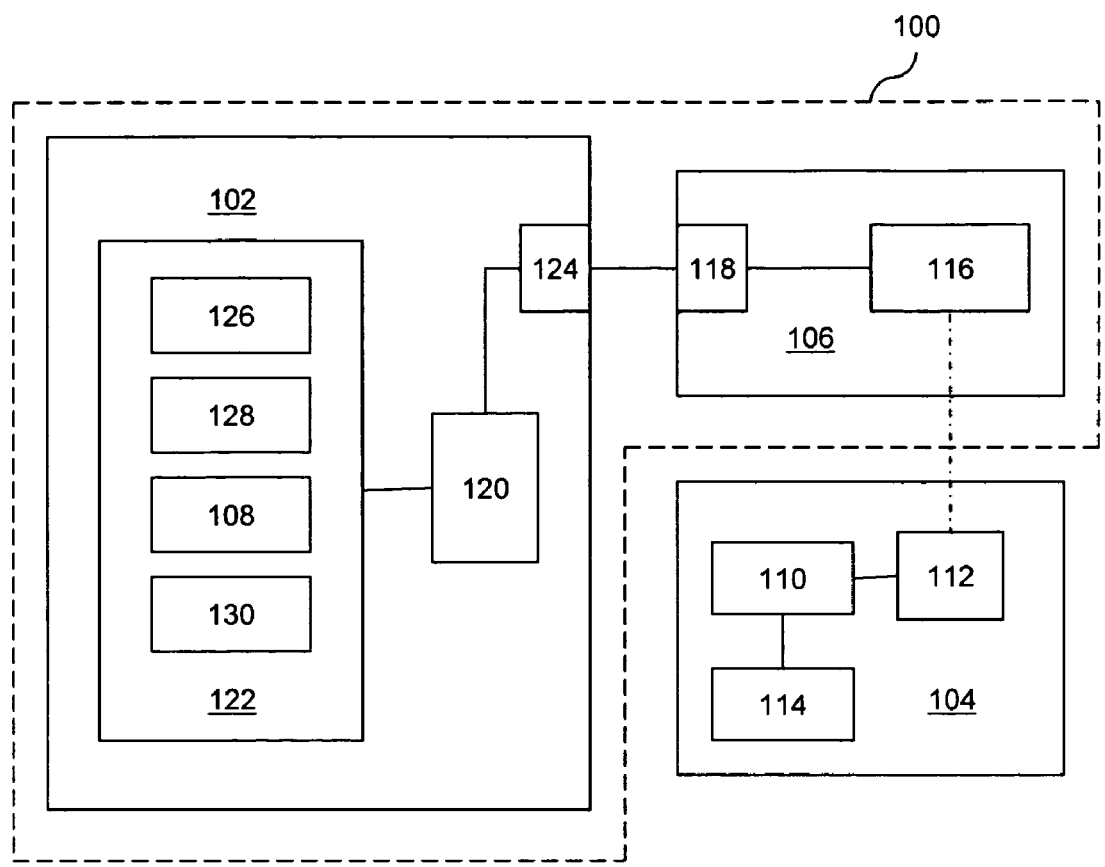
FIG. 1 is a schematic block diagram of one embodiment of a flash memory device communicatively coupled to a host unit in accordance with the principles of the present invention.

Referring to FIG. 1, a schematic block diagram of one embodiment of a flash memory device 104 communicatively coupled to a host unit 100 in accordance with the principles of the present invention is shown. The host unit 100 generally includes a host device 102 communicatively coupled to a host accessory device 106. A flash memory application framework module 108 is installed on the host device 102. The flash memory device 104 generally includes a flash memory controller 110 communicatively coupled to an inductive antenna system 112, and a flash memory 114. The flash memory controller 110 implements data read, write and/or erase commands received via the inductive antenna system 112 on the data stored in the flash memory 114. The flash memory controller 110 also retrieves data from and stores data onto the flash memory 114 in accordance with read and/or write commands received via the inductive antenna system 112.

The host accessory device 106 generally includes a reader/writer 116 and a host accessory data port 118. The host accessory device 106 operates as an interface between the host device 102 and the flash memory device 104. The flash memory application framework module 108 is a software application module that is loaded onto the host device 102 and generally manages the manipulation of data transmitted to and received from the flash memory device 104 at the host device 102. The flash memory application framework module 108 also generates specific read, write and/or erase commands for issuance to the flash memory device 104 via the host accessory device 106.

The host device 102 generally includes a host controller 120, a host memory 122 and a host data port 124. The host device 102 may also include other components that facilitate the use and operation of the host device 102, such as for example, a display screen and input/output devices. Examples of host devices 102 include, but are not limited to, personal computers and handheld computer devices. The host memory 122 generally includes an operating system module 126, one or more host application modules 128, a flash memory application framework module 108, and a cache memory 130. The operating system module 126, among other things, provides library and driver support for the host controller 120 and the host data port 124. The flash memory application framework module 108 interfaces with the host application module 128 and provides general runtime support, including but not limited to, communication management, application management, and data management. The cache memory 130 is used to store a copy of data downloaded from one or more flash memory devices 104.

The host device 102 may interact with one or more flash memory devices 104. Each flash memory device 104 is typically associated with a specific host application module 128. In other words, the data stored on a particular flash memory device 104 is typically data generated by the associated host application module 128. A single host application module 128 may interact with one or more flash memory devices 104. For example, if the host application module 128 is a warranty host application module that manages data relating to the warranty of a particular device, the warranty host application module is affiliated with one or more specific flash memory devices 104. The warranty data generated by the warranty host application module is forwarded to the flash memory application framework module 108. The flash memory application framework module 108 appropriately manipulates the received warranty data for storage on the associated one or more flash memory devices 104.

The host device 102 generates specific commands to retrieve data stored on the flash memory device 104 and/or manipulate the storage of data on the flash memory device 104. More specifically, the flash memory application framework module 108, running on the host device 102, generates the specific data read, write and/or erase operations to be performed on the data stored on the flash memory 114 in the flash memory device 104. The host accessory device 106 operates as the interface between the host device 102 and the flash memory device 104 and transmits the read, write, and/or erase commands issued by the host device 102 to the flash memory device 104. The flash memory controller 110 receives and implements the read, write and/or erase commands issued by the host device 102.

In one embodiment, the host device 102 translates the file level read, write and/or erase commands into low level read, write and/or erase commands that are recognizable by the flash memory device 104. The translated low-level read, write and/or erase commands are transmitted to the reader/writer 116. The reader/writer 116 transmits the received low-level read, write and/or erase commands to the flash memory device 104. In another embodiment, the host device 102 forwards the file level read, write and/or erase commands to the reader/writer 116 and the reader/writer 116 translates the received file level read, write and/or erase commands into low-level read, write and/or erase commands that are recognizable by the flash memory device 104. The translated low-level read, write and/or erase commands are transmitted from the reader/writer 116 to the flash memory device 104 for implementation.

A communicative coupling between the host device 102 and the host accessory device 106 is established via the host data port 124 and the host accessory data port 118. In one embodiment, the host device 102 is communicatively coupled to the host accessory device 106 via a wired communication system. Wired communication can be achieved, for example, via a serial data connection, a parallel data connection, or a USB connection. In another embodiment, the host device 102 is communicatively coupled to the host accessory device via a wireless communication system, such as for example, via a Bluetooth communication system. In another embodiment, the host accessory device 106 is integrated with the host device 102 as a component of the host device 102.

When the host accessory device 106 receives a command signal from the host device 102 to retrieve data from the flash memory device 104 or to update data stored on the flash memory device 104, the host accessory device 106 responsively establishes a radio frequency (RF) field between the host accessory device 106 and the flash memory device 104. More specifically, the reader/writer 116 generates an RF field between the reader/writer 116 and the inductive antenna system 112. The generated RF field creates a RF power coupling between the reader/writer 116 and the inductive antenna system 112 thereby powering the electronic components of the flash memory device 104. The generated RF field also creates a contactless communication channel between the reader/writer 116 and the flash memory device 104.

In one embodiment, the contactless communication channel between the reader/writer 116 and the flash memory device 104 is established only during those periods when active read, write and/or erase operations are being performed on the data stored in the flash memory device 104. In other words, the contactless communication channel between the reader/writer 116 and the flash memory device 104 is terminated once the transfer of data between the host device 102 and the flash memory device 104 is complete. In one embodiment, the flash memory device 104 is powered by the reader/writer 116 only during those periods when active read, write and/or erase operations are being performed on the data stored in the flash memory device 104. In one embodiment, the RF field between the reader/writer 116 and the flash memory device 104 is established only during those periods when active read, write and/or erase operations are being performed on the data stored in the flash memory device 104.

In one embodiment, the flash memory device 104 is positioned approximately 1 mm to approximately 2 mm away from the host accessory device 106 in order to be within range for the reader/writer 116 to be able to establish the RF field between the reader/writer 116 and the flash memory device 104. In one embodiment, the carrier frequency for exchanging data between the reader/writer 116 and the flash memory device 104 is approximately 2.45 GHz.

Figure 2:
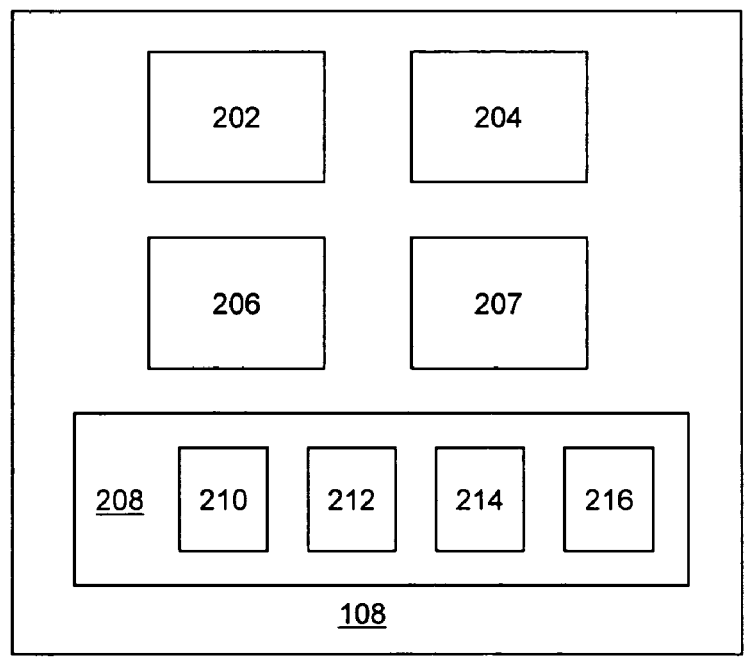
FIG. 2 is a block diagram representation of one embodiment of a flash memory application framework module in accordance with the principles of the present invention.

Referring to FIG. 2, a block diagram representation of one embodiment of a flash memory application framework module 108 in accordance with the principles of the present invention is shown. The flash memory application framework module 108 interfaces with the host application module 128 and interacts with the one or more flash memory devices 104 dedicated to storing the data generated by that host application module 128. The flash memory application framework 108 can support one or more different types of host application modules 128. The flash memory application framework module 108 generally includes a communication module 202, a runtime management module 204, an application management module 206, a flash memory interaction module 207, and a data management module 208.

The communication module 202 monitors the status of the one or more flash memory devices 104 associated with the host application module 128 based on information received from the host accessory device 106. Examples of the types of status events monitored include, but are not limited to, whether the flash memory device 104 is within range or out of range of the host accessory device 106, whether a contactless communication channel between the host accessory device 106 and the flash memory device 104 is available or unavailable, and whether a read, erase, and/or write operation to the flash memory device 104 is in progress. The communication module 202 also packages the data at the host device 102 for transmission to the flash memory device 104 and synchronizes the transmission of data from the host device 102 to the flash memory device 104.

The runtime management module 204 manages the operation of the flash memory application framework module 108 including the starting up and shutting down of the flash memory application framework module 108. The runtime management module 204 also manages the resources, such as for example, threads and communication channels associated with the flash memory application framework module 108.

The application management module 206 retrieves flash memory specific data to determine whether a flash memory device 104 is dedicated to storing data associated with a particular host application module 128. Examples of flash memory specific data include, but are not limited to, flash memory device header data, registration data, activation data, and host application compatibility data. If there are multiple host application modules 128 installed in a host device 102, the application management module 206 evaluates the flash memory specific data retrieved from a flash memory device 104 to determine the specific host application module 128 associated with that flash memory device 104.

The flash memory interaction module 207 generally tracks historical data associated with interactions between the host application module 128 and the associated one or more flash memory devices 104. The flash memory interaction module 208 uses the historical data to determine, the most recent flash memory device 104 that has been cached to the host device 102, the availability of space in the cache memory 130 for caching a flash memory device 104, and whether the data previously cached from a flash memory device 104 can be deleted.

The data management module 208 manipulates the data received from and transmitted to the flash memory device 104. When a host application module 128 is initiated, the reader/writer 116 establishes an RF field with the flash memory device 104 associated with the initiated host application module 128 thereby powering the flash memory device 104 and establishing a contactless communication channel between the reader/writer 116 and the flash memory device 104. The data stored on the flash memory device 104 is downloaded to the host device 102 via the host accessory device 106 and stored in the cache memory 130. In one embodiment, the entire data content of the flash memory device 104 is downloaded from the flash memory device 104 and stored in the cache memory 130. In another embodiment, selected data files are downloaded from the flash memory device 104 and stored in the cache memory 130. Each of the downloaded data files that are stored in the cache memory 130 are designated as the original versions of the data files.

The data management module 208 generally includes a data marshaller 210, a data chunk evaluator 212, a data chunk comparator 214, and a data update scheduler 216. Once the host application module 128 has completed performance of host application specific functions, an updated version of the data file is forwarded to the data management module 208. The updated version of the data file generated by the host application module 128 and forwarded to the data management module 208 is in the original host application generated data format. The host application module 128 generated updated data file may include file content having one or more different types of data, such as for example, simple integer data, and/or complex data structures. Complex data structures may include, for example, hierarchically structured data. The data marshaller 210 serializes the hierarchically structured data to generate a representative consecutive serialized data byte sequence of the updated version of the data file in a binary flat file format.

The data chunk evaluator 212 receives the serialized data byte sequence of the updated data file and identifies logical breakpoints in serialized data byte sequence based on the data values represented by the bytes contained within the serialized data byte sequence. The data chunk evaluator 212 partitions the serialized data byte sequence into multiple consecutive variable length data chunks. The length of the variable length data chunks vary between pre-defined upper and lower limits for the length of a data chunk.

The data chunk comparator 214 compares the original version of the data file, that is stored in the cache memory 130, with the updated version of the data file received from the data chunk evaluator 212, on a data chunk by data chunk basis. The data chunk comparator 214 identifies specific data chunk modifications to the original version of the data file necessary to derive the updated version of the data file. Data specific data chunk modifications involve the deletion of one or more data chunks from the serialized data byte sequence of the original version of the file data and/or the addition of one or more data chunks to the serialized data byte sequence of original version of the file data.

If a data value represented by one or more bytes within a data chunk is modified, the data chunk containing the altered data value requires modification. Only those data chunks in the data file containing altered data values are modified. The unchanged data chunks within the data file are not updated. The selective updating of only the modified data chunks within a data file typically requires a reduced number of delete and/or write operations necessary to update an original version of a data file stored on a flash memory device 104 to an updated version of the data file when compared to the number of delete and/or write operations typically required to delete an entire original data file and write an entire updated data file to the flash memory device 104.

In one embodiment, the data chunk comparator 214 compares the actual data chunks from the original version of the data file with the actual data chunks in the updated version of the data file. In another embodiment, the data chunk comparator 214 compares the digital signatures associated with the data chunks in the original version of the data file with the digital signatures associated with the data chunks in the updated version of the data file and identifies specific data chunk modifications necessary to update the original version of the data file. In yet another embodiment, the data chunk comparator 214 generates the digital signatures by applying a hash function to each of the data chunks thereby generating a unique hash value for each of the data chunks. The unique hash value associated with a data chunk operates as the digital signature that uniquely identifies that data chunk.

Once the data chunk comparator 214 has identified specific data chunk deletions and/or additions necessary to update the original version of the data file to the updated version of the data file, a data update schedule detailing each of the identified data chunk modifications is prepared and forwarded to a data update scheduler 216. The reader/writer 116 establishes an RF field with the flash memory device 104 thereby powering the flash memory device 104 and establishing a contactless communication channel between the reader/writer 116 and the flash memory device 104. The data update scheduler 216 fetches one data chunk modification at a time from the data update schedule and performs the corresponding update to the original version of the data file stored in the flash memory 114.

The performance of each of the data chunk modifications in the data update schedule is logged as the modification is completed. In the event, the RF link is temporarily disconnected and/or power to the flash memory device 104 is temporarily disrupted and/or the contactless communication channel between the reader/writer 116 and the flash memory device 104 is temporarily disconnected, the data update scheduler 216 can resume implementation of the remaining data chunk modification updates once the contactless communication channel between the reader/writer 116 and the flash memory device 104 is reestablished.

As shown in FIG. 1, one embodiment of the host unit 100 generally includes the host device 102 communicatively coupled to the host accessory device 106. The flash memory application framework module 108 is installed on the host device 102. The flash memory application framework module specific functions are performed at the host device 102 by the host controller 102. The flash memory application framework module 108 interfaces with the host application module 128 residing on the host device 102 and interacts with one or more flash memory devices 104 dedicated to storing the data generated by that host application module 128 via the host accessory device 106.

In another embodiment, the host unit includes a host device with an integrated host accessory device. The flash memory application framework module 108 is installed on the integrated host device/host accessory device. The flash memory application framework module specific functions are performed at the integrated host device/host accessory device by the integrated host device/host accessory device controller. The flash memory application framework module 108 interfaces with the host application module 128 residing on the integrated host device/host accessory device and interacts with one or more flash memory devices 104 dedicated to storing the data generated by that host application module 128.

In another embodiment, the host unit consists of a host accessory device, where the host accessory device includes a host accessory device controller and a host accessory device memory. The flash memory application framework application module 108 is installed on the host accessory device. The flash memory application framework module specific functions are performed at the host accessory device by the host accessory device controller. The flash memory application framework module 108 interfaces with the host application module 128 residing on the host device and interacts with one or more flash memory devices 104 dedicated to storing the data generated by that host application module 128.

In another embodiment, the host unit consists of a host device and a host accessory device, where the host accessory device includes a host accessory device controller and a host accessory device memory. Some of the flash memory application framework module specific functions may be performed at the host device by the host controller while other flash memory application framework module specific functions may be performed at the host accessory device by the host accessory device controller. The flash memory application framework module 108 interfaces with the host application module 128 residing on the host device and interacts with one or more flash memory devices 104 dedicated to storing the data generated by that host application module 128.

Figure 3A:
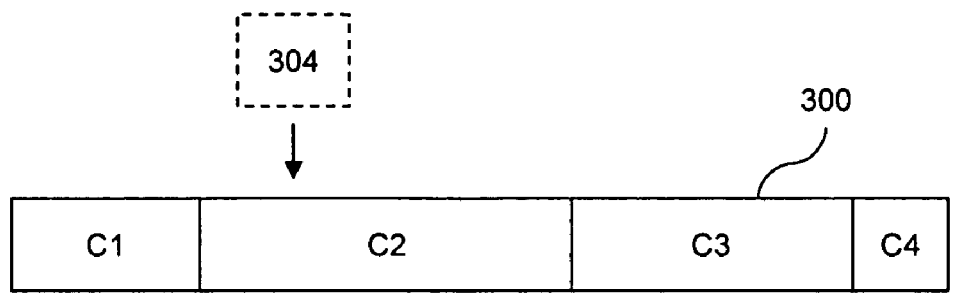
FIGS. 3(a)-(b) is an illustration of an example of updating an original version of a data file to an updated version of the data file in accordance with the principles of the present invention.

Referring to FIGS. 3(a) and (b) one example illustrating the updating of an original version of a data file 300 to an updated version of the data file 302 in accordance with the principles of the present invention is shown. Turning first to FIG. 3(a), an original version of the data file 300 has been evaluated by a data chunk evaluator 212 to include four data chunks C1, C2, C3, and C4. The updated version of the data file 302 includes a new segment of data 304 that has been inserted into the middle of the original data chunk C2.

Figure 3B:
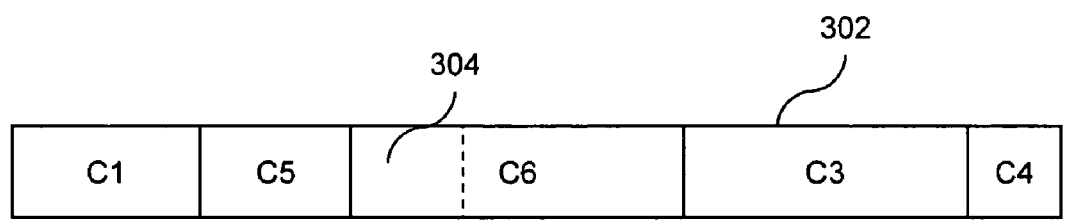

As shown in FIG. 3(b), the data chunk evaluator 212 evaluated the updated version of the data file 302 and partitioned the updated version of the data file 302 into five data chunks C1, C5, C6, C3, and C4. The data chunk comparator 214 compared the hash values of the data chunks in the original version of the data file 300 with the hash values of the data chunks in the updated version of the data file 302. The data chunk comparator 214 identified the following data chunk modifications to update the original version of the data file 300 to the updated version of the data file 302: the deletion of data chunk C2 from the original data file 300, and the addition of new data chunks C5 and C6. Data chunks C1, C3 and C4 remain unchanged.

Note that the data chunk C2 and the new data segment 304 were combined before being forwarded to the data chunk evaluator 212 for processing. The data chunk evaluator 212 determined that the combined data chunk (consisting of data chunk C2 and the new data segment 304) could be logically divided into data chunks C5 and C6. The data chunk modifications required to update the original version of the data file 300 to the updated version of the data file 302 in the flash memory device 104 require the deletion of data chunk C2, the addition of data chunk C5 following the data chunk C1, and the addition of data chunk C6 following the data chunk C5. A total of three data chunk delete and/or write operations are involved in updating the original version of the data file 300 to the updated version of the data file 302.

Figure 4A:
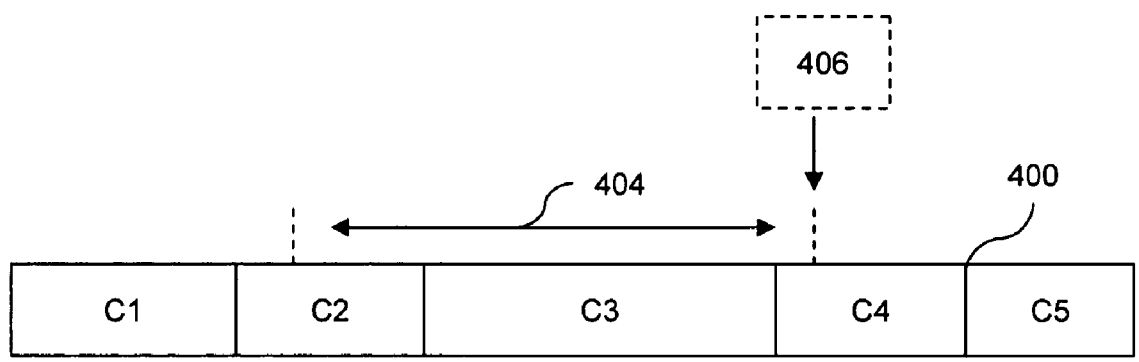
FIGS. 4(a)-(b) is an illustration of another example of updating of an original version of a data file to an updated version of the data file in accordance with the principles of the present invention.

Referring to FIGS. 4(a) and (b) another example illustrating the updating of an original version of data file 400 to an updated version of data file 402 in accordance with the principles of the present invention is shown. Turning first to FIG. 4(a), an original version of a data file 400 has been evaluated by a data chunk evaluator 212 to include five data chunks C1, C2, C3, C4, and C5. Updating the original version of the data file 400 to reflect the updated version of the data file 402 require the deletion of a portion of the data chunk C2, the deletion of the data chunk C3, the deletion of a portion of the data chunk C4 (indicated by 404) and the addition of a new segment of data 406 that has been inserted into the middle of the original data chunk C4.

Figure 4B:
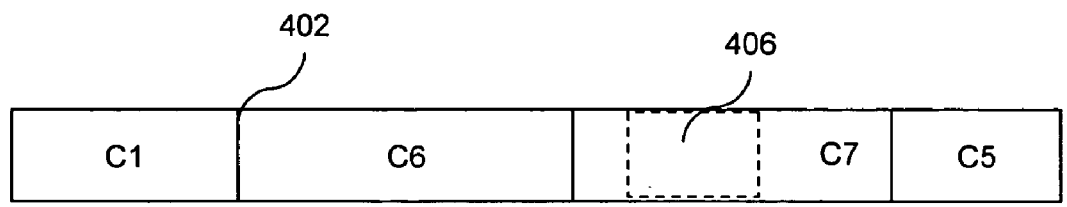

As shown in FIG. 4(b), the data chunk evaluator 212 evaluated the updated version of the data file 402 and partitioned the updated data file 402 into four data chunks C1, C6, C7, and C5. The data chunk comparator 214 compared the hash values of the data chunks in the original version of the data file 400 with the hash values of the data chunks in the updated version of the data file 402. The data chunk comparator 214 identified the following data chunk modifications to update the original version of the data file 400 to the updated version of the data file 402: the deletion of data chunks C2, C3, and C4, and the addition of new data chunks C6 and C7. Data chunks C1 and C5 remain unchanged.

Note that the remaining portion of the data chunk C2, the remaining portion of the data chunk C4 and the new data segment 406 were combined before being forwarded to the data chunk evaluator 212 for processing. The data chunk evaluator 212 determined that the combination of the remaining portions of the data chunks C2 and C4 and the new data segment 406 could be logically divided into data chunks C6 and C7. The data chunk modifications required to update the original version of the data file 400 to the updated version of the data file 402 require the deletion of the data chunk C2, the deletion of the data chunk C3, the deletion of the data chunk C4, the addition of data chunk C6 following data chunk C1, and the addition of data chunk C7 following data chunk C6. A total of five data chunk delete and/or write operations are involved in updating the original version of the data file 400 to the updated version of the data file 402.

Referring to FIGS. 5(a) and (b) an illustration of one embodiment of a data file storage organization scheme for storing a data file on the flash memory device 104 in accordance with the principles of the present invention is shown. Turning first to FIG. 5(a), a data file record 500 is stored on the flash memory device 104 for each of the data files stored on the flash memory device 104. The data file record 500 is created at the host device 102 and forwarded to the flash memory device 104 for storage. The data file record 500 includes the data file name 502, one or more data file attributes 504, the number of data chunks in the data file 506 and a sequential listing of data chunk record pointers 508, 510, 512. Examples of file attributes 504 include, but are not limited to, a timestamp of when the original data file was created, a timestamp of if and when the data file was last modified, the data file size, and whether the data file is a modifiable read/write file or a read only file.

Every data chunk in the data file has an associated data chunk record 513. Each of the data chunk record pointers 508, 510, 512, points to the location of the associated data chunk record 513 stored in the flash memory 114. The data chunk pointer 508 is the address location of the associated data chunk record 513 in the flash memory 114. The sequential arrangement of the data chunk record pointers 508, 510, 512 represents the sequential arrangement of the data chunks in the data file.

In one embodiment, each variable length data chunk consists of one or more data blocks where the data blocks have a uniform pre-defined data length. Each data chunk record 513 includes the data chunk size 514, the number of data blocks in the data chunk 516, and a sequential listing of data block pointers 518, 520, 522. The actually data blocks may be stored in separate non-consecutive locations within the flash memory 114. The data block pointers 518, 520, 522 define the location where the data blocks are actually stored in the flash memory 114. The data block pointers are address locations of the associated data blocks in the flash memory 114. The sequential arrangement of the data block pointers 518, 520, 522 represents the sequential arrangement of the data blocks in the data chunk.

Once the entire data content of a flash memory device 104 has been downloaded into the cache memory 130, the downloaded data content is used to reconstruct the original version of the file data at the host device 102. In order to reconstruct the sequential arrangement of the data chunks for a data file at the host device 102, each of the sequential listing of data chunk record pointers 508, 510, 512, is used to retrieve the associated data chunk record 513. The sequential listing of data block pointers 518, 520, 522 in each data chunk record 513 is used to locate and retrieve the data blocks associated with each of the data chunks. Modifications to the data chunks stored in the flash memory device 104 may involve erase and/or write operations involving one or more of the following: one or more data file attributes 504, the number of data chunks in the data file 506, one or more data chunk record pointers 508, 510, 512, and one or more data chunk records 513.

Referring to FIGS. 6(a) and (b) an illustration of another embodiment of a data file storage organization scheme for storing a data file on the flash memory device 104 in accordance with the principles of the present invention is shown. A data file record 600 is stored on the flash memory device 104 for each of the data files stored on the flash memory device 104. The data file record 600 is created at the host device 102 and forwarded to the flash memory device 104 for storage. The data file record 600 includes the data file name 602, one or more data file attributes 604, and a sequential listing of the hash values 606, 608, 610, for each of the data chunks in the data file. The sequential arrangement of the data chunk hash values 606, 608, 610, represents the sequential arrangement of the data chunks in the data file. Each of the data chunks has an associated data chunk file 612, 614, 616. Each of the individual data chunk files 612, 614, 616, includes a single data chunk. Each of the different data chunk files 612, 614, 616 may be stored in different non-consecutive locations in the flash memory 114.

Once the entire data content of a flash memory device 104 has been downloaded into the cache memory 130, the downloaded data content is used to reconstruct the original version of the file data at the host device 102. In order to reconstruct the sequential arrangement of the data chunks for a data file at the host device 102, the hash values 606, 608, 610 of each of the data chunks in the file record 600 is compared to the hash values of the data chunks contained in each of the data chunk files 612, 614, 616. When a match is found, a copy of the associated data chunk is retrieved from the data chunk file 610, 612, 614, and positioned in accordance with the position of the file record hash value sequence. For example, the hash value of the first chunk in the file record is compared to the hash values of the data chunks contained in each of the data chunk files 612, 614, 616, until a match is found. When the hash value of the first data chunk 606 from the data file record 600 matches the hash value of the data chunk contained in a particular data chunk file, a copy of that data chunk is retrieved from the data chunk file and positioned as the first data chunk in the data file. This process is repeated for each of the data chunk hash values 606, 608, 610 listed in the data file record 600 until each of the associated data chunks have been retrieved from the associated data chunk files 612, 614, 616. Modifications to the data chunks stored in the flash memory device 104 may involve erase and/or write operations involving one or more of the following: one or more data file attributes 604, one or more data chunk hash values 606, 608, 610, and one or more data chunk files 612, 614, 616.

Figure 7A:
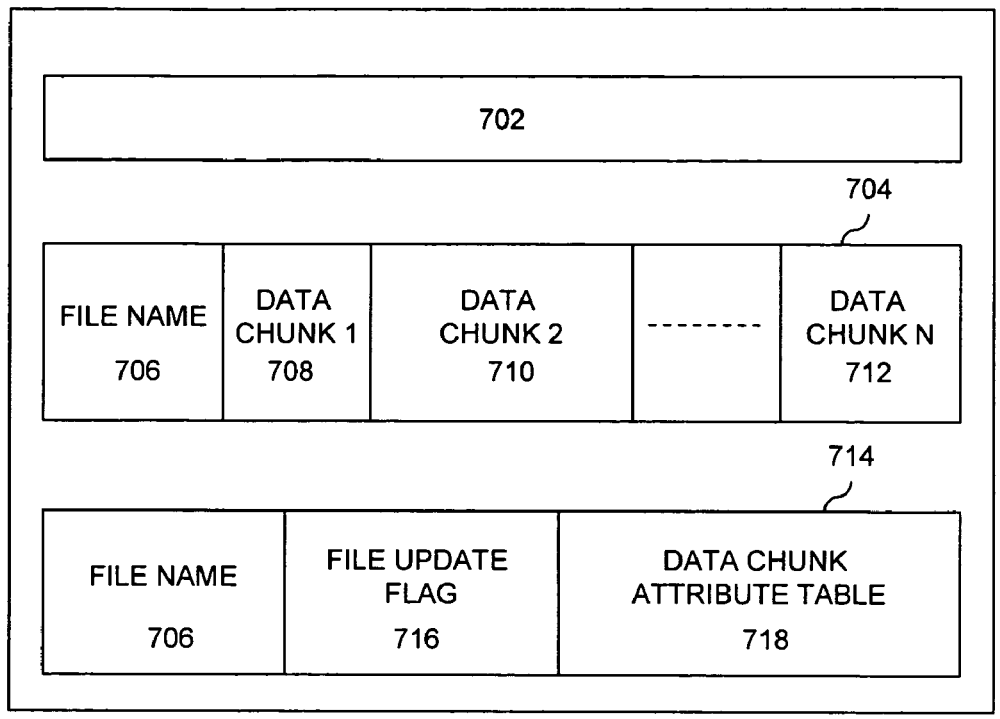
FIG. 7(a) is an illustration of one embodiment of a data file storage organization scheme for manipulating a data file retrieved from a flash memory device at a host device in accordance with the principles of the present invention.
Figure 7B:
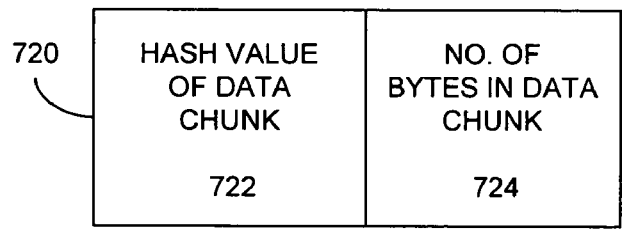
FIG. 7(b) is an illustration of one embodiment of a host data chunk record in accordance with the principles of the present invention.
Figure 7C:
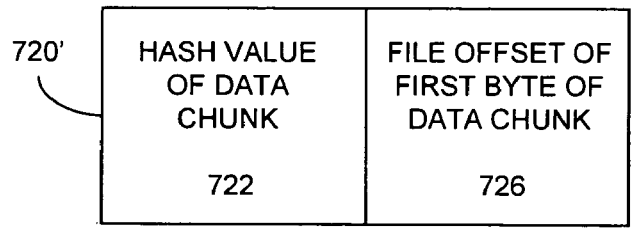
FIG. 7(c) is an illustration of another embodiment of a host data chunk record in accordance with the principles of the present invention.

Referring to FIG. 7(*a*) an illustration of one embodiment of a data file storage organization scheme for storing a data file retrieved from the flash memory device 104 in a host device memory 122 in accordance with the principles of the present invention is shown. Turning first to FIG. 7(*a*) the entire the flash memory device data content 702 is downloaded into the cache memory 130. The data downloaded from the flash memory device 104 is used to reconstruct the original version of the one or more data files stored in the flash memory device 104. The reconstructed data file 704 includes the file name 706 followed by a sequential ordering of the data chunks 708, 710, 712, as they appeared in the serialized data byte sequence representation of the data file.

In some cases, the original version of the data file generated by the host application module 128 may have had a hierarchical data structure. If the host application module 128 requires access to such a data file in hierarchical form, the data marshaller 210 converts the reconstructed data file 704 from the serialized data byte sequence representation of the data file to the deserialized original hierarchical data structure that was originally generated by the host application module 128.

The reconstructed data file 704 is used to generate a host data file record 714 in the host device 102. The host data file record 714 includes the data file name 706, a file update flag 716 and a data chunk attribute table 718. The file update flag 716 indicates whether the data file is the original version of the data file retrieved from the flash memory device 104 or an updated version of the data file generated by the host application module 128. The reconstructed data file 704 is used to derive a data chunk attribute table 718. The data chunk attribute table 718 includes a sequential listing of host data chunk records 720 for each of the data chunks 708, 710, 712, in the order that the associated data chunks 708, 710, 712, appear in the reconstructed data file 704.

Referring now to FIG. 7(*b*), an illustration of one embodiment of a host data chunk record 720 in accordance with the principles of the present invention is shown. Each of the host data chunk records 720 includes a hash value of the data chunk 722, and the number of bytes in the data chunk 724. Referring to FIG. 7(*c*) an illustration of another embodiment of a host data chunk record 720' in accordance with the principles of the present invention is shown. Each of the host data chunk records 720' includes a hash value of the data chunk 722 and the file offset of the first byte of the data chunk 726. The file offset of the first byte of the data chunk 726 is determined with respect to the position of the first byte of the first data chunk 708 in the reconstructed data file 704. In yet another embodiment of the host data chunk record, each of the host data chunk records includes a hash value of the data chunk, the number of bytes in the data chunk, and the file offset of the first byte of the data chunk.

When an updated version of a data file is received at the flash memory application framework 108 for processing, the data marshaller 210 serializes the hierarchically structured data to generate a serialized data byte sequence of the updated version of the data file. The data chunk evaluator 212 partitions the serialized data byte sequence into multiple consecutive variable length data chunks. The data chunk comparator 214 applies a hash function to each of the data chunks in the data file thereby generating a unique hash value for each of the data chunks. A host data file record 714 is created for the updated version of the data file. The file update flag 716 is set to indicate that the data file is an updated version of the data file. The data chunk attribute table 718 including a sequential listing of host data chunk records 720 for each of the data chunks 708, 710, 712 is created. Each of the host data chunk records 720 includes a hash value of the associated data chunk 722.

Figure 8:
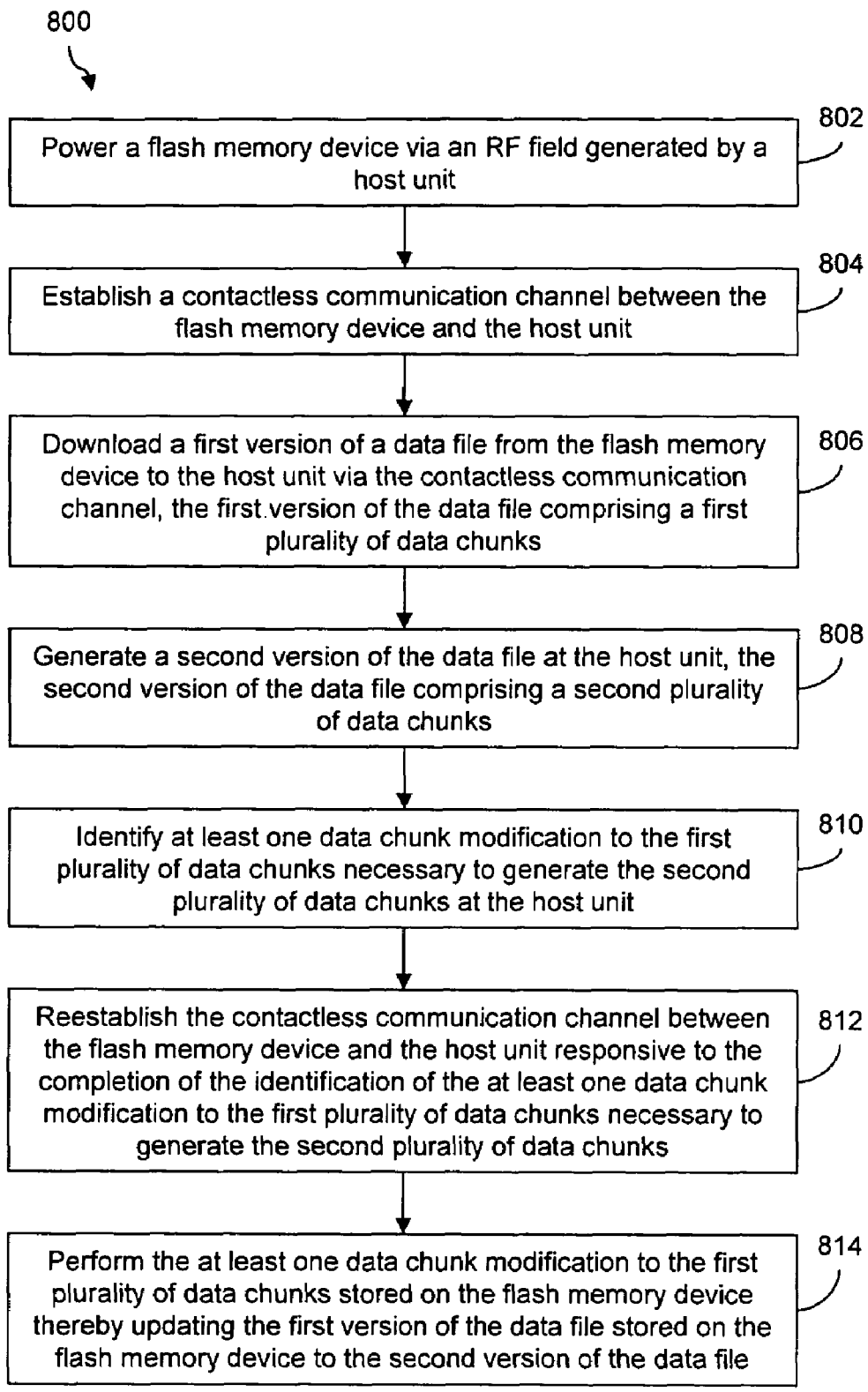
FIG. 8 is a flowchart of one embodiment of a method of updating a data file stored on a flash memory device in accordance with the principles of the present invention.

Referring to FIG. 8, a flowchart of one embodiment of a method 800 of updating a data file stored on a flash memory device 104 in accordance with the principles of the present invention is shown. The method includes powering a flash memory device 104 via an RF field generated by a host unit 100 at step 802 and establishing a contactless communication channel between the flash memory device 104 and the host unit 100 at step 804. A first version of a data file is downloaded from the flash memory device 104 to the host unit 100 via the contactless communication channel at step 806. The first version of the data file includes a first plurality of data chunks. At step 808, a second version of the data file is generated at the host unit 100. The second version of the data file includes a second plurality of data chunks. At step 810, at least one data chunk modification to the first plurality of data chunks necessary to generate the second plurality of data chunks is identified at the host unit 100. The contactless communication channel is reestablished between the flash memory device 104 and the host unit 100 responsive to the completion of the identification of the at least one data chunk modification to the first plurality of data chunks necessary to generate the second plurality of data chunks at step 812. The at least one data chunk modification to the first plurality of data chunks stored on the flash memory device 104 is performed thereby updating the first version of the data file stored on the flash memory device 104 to the second version of the data file at step 814. It should be noted that while the steps in the method 800 have been described in a particular order, performing one or more of the steps in a different order are also considered to be within the scope of the invention.

Figure 9A:
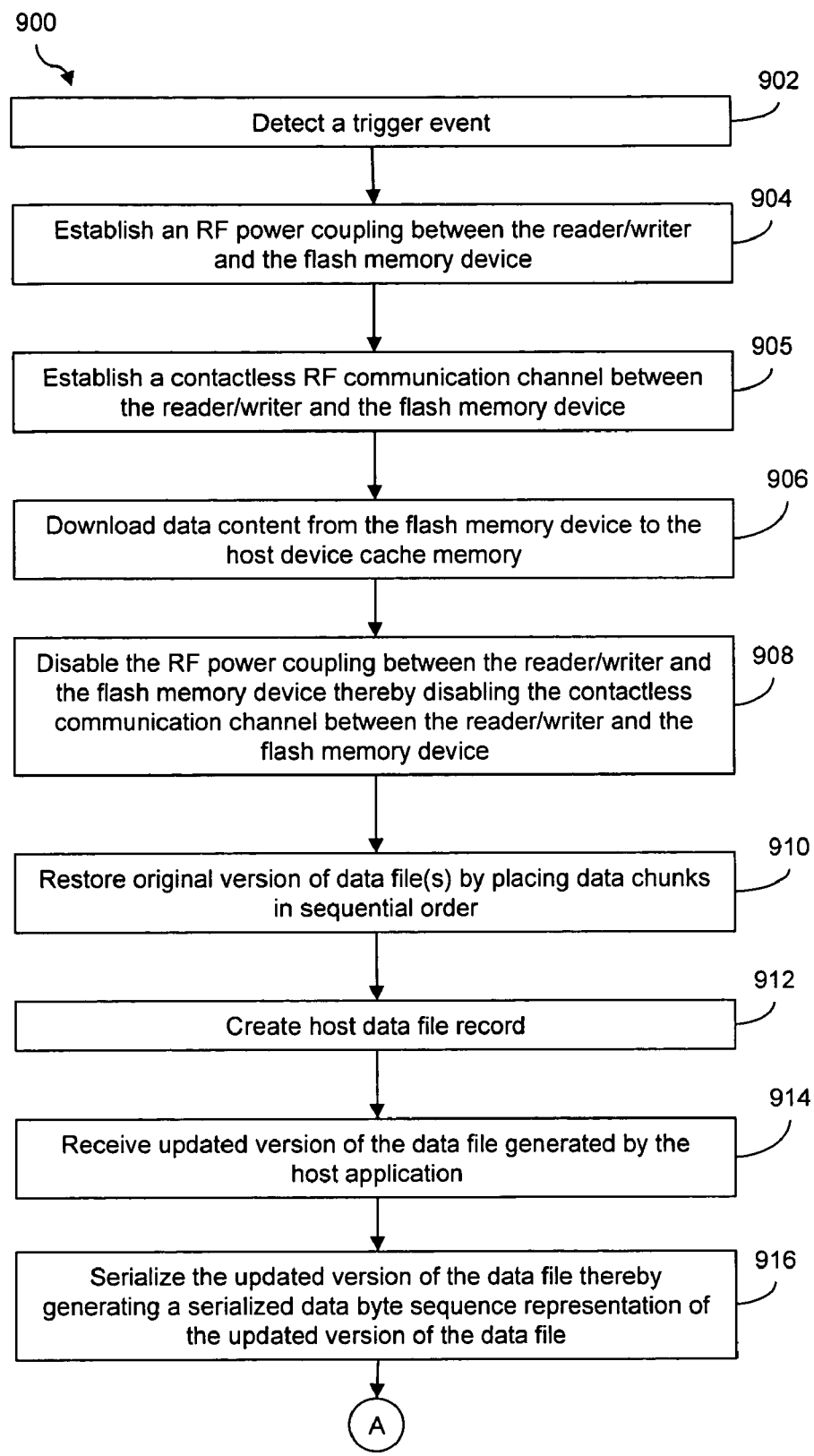
FIGS. 9 (a)-(b) is a flowchart of another embodiment of a method of updating an original version of a data file stored on a flash memory device to an updated version of the data file in accordance with the principles of the invention.
Figure 9B:
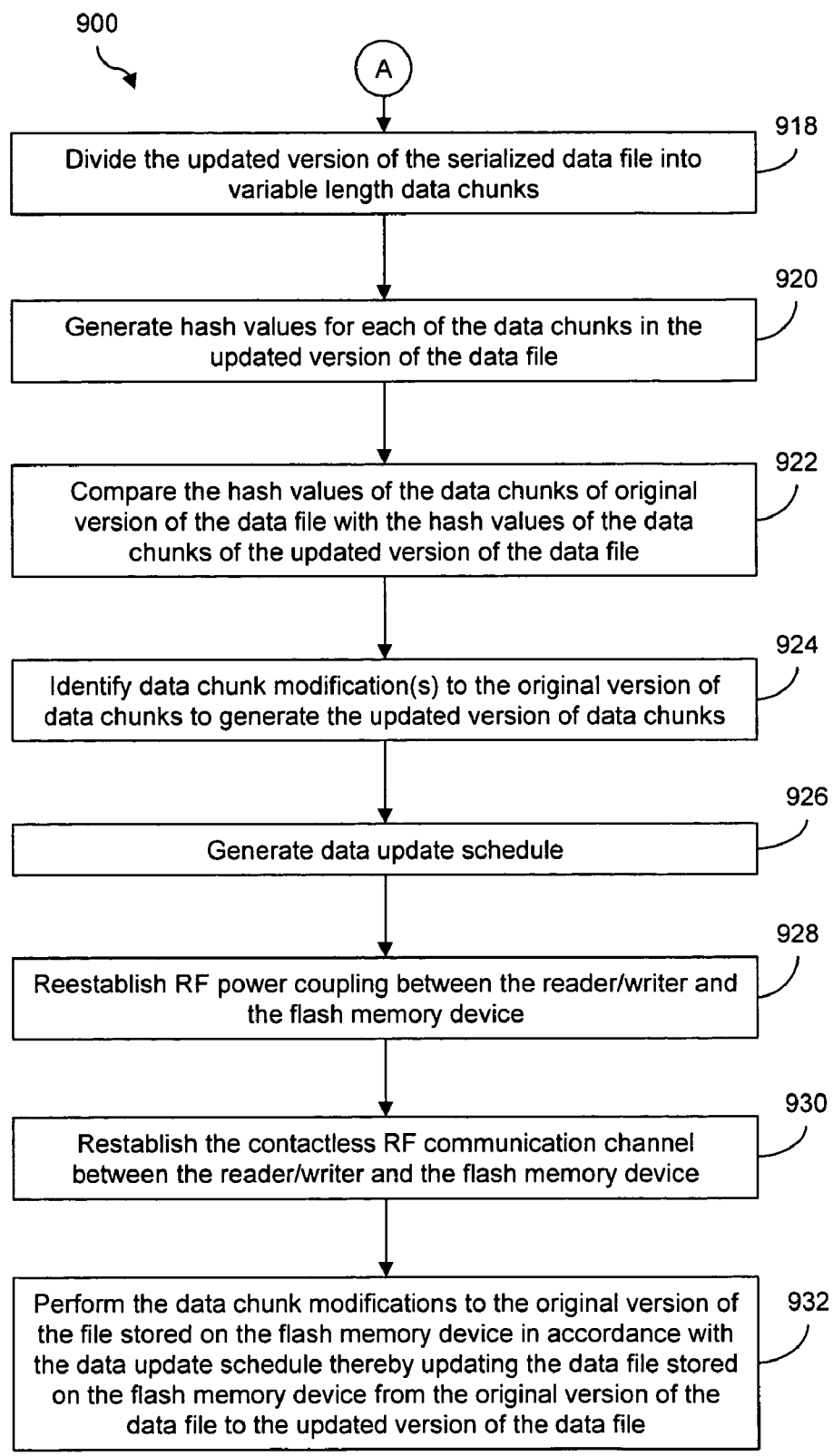

Referring to FIGS. 9(*a*) and (*b*), a flowchart of another embodiment of a method 900 of updating an original version of a data file stored on a flash memory device 104 to an updated version of the data file in accordance with the principles of the present invention is shown. The method 900 begins at step 902 with the detection of a trigger event. In one embodiment, the trigger event is the initiation of the host application module 128 associated with the flash memory device 104. In another embodiment, the trigger event is the user selection of a target flash memory device 104 for the retrieval of data files from the target flash memory device 104. Responsive to the trigger event, the reader/writer 116 establishes an RF power coupling between the reader/writer 116 and the flash memory device 104 at step 904. A contactless RF communication channel is established between the reader/writer 116 and the flash memory device 104 at step 905.

At step 906, the entire data content of the flash memory 114 is downloaded into the cache memory 130 at the host device 102. Once the download operation is complete, the RF field between the reader/writer 116 and the flash memory device 104 is disabled thereby disabling the contactless communication channel between the reader/writer 116 and the flash memory device 104 at step 908. While the method 900 includes the step of disabling the RF coupling between the reader/writer 116 and the flash memory device 104, maintaining an RF field between the reader/writer 116 and the flash memory device 104 is also considered to be within the scope of the invention. In one embodiment, the RF coupling between the reader/writer 116 and the flash memory device 104 is maintained while the contactless communication channel between the flash memory device 104 and the host device 100 is disabled.

The host device 102 uses the data downloaded from the flash memory device 104 into the cache memory 130 to reconstruct the original version of the data file 704 by retrieving the appropriate data chunks 708, 710, 712, from the cache memory 130 and placing the retrieved data chunks 708, 710, 712, in sequential order at step 910. The reconstructed data file 704 contains a serialized data byte sequence which represents the original version of the data file.

At step 912, the host device 102 uses the reconstructed data file 704 to create an associated host data file record 714. The host data file record 714 includes the file name 706, a file update flag 716 and a data chunk attribute table 718. The file update flag 716 is set to indicate that the data file is the original version of the data file retrieved from the flash memory device 104. The data chunk attribute table 718 includes a sequential listing of host data chunk records 720 for each of the data chunks 708, 710, 712 in the order that the associated data chunks 708, 710, 712 appear in the original version of the data file 704. Each of the host data chunks records 720 includes the hash value of the associated data chunk 722.

The updated version of the data file is received from the host application module 128 at the data management module 208 at step 914. At step 916, the data marshaller 210 serializes the updated version of the data file thereby generating a serialized data byte sequence representation of the updated version of the data file. The data chunk evaluator 212 identifies logical breakpoints in the updated version of the serialized data file and divides the updated version of the data file into multiple consecutive variable length data chunks at step 918.

Hash values are generated for each of the data chunks in the updated version of the data file at step 920. A host data file record 704 is created for the updated version of the data file. The file update flag 716 is set to indicate that the data file is an updated version of the data file. Using the host data file record for the original version of the data file and the host data file record for the updated version of the data file, the data chunk comparator 214 compares the hash values of the data chunks of the original version of the data file with the hash values of the data chunks of the updated version of the data file at step 922. The data chunk comparator 214 identifies the specific data chunk level modifications to the data chunk sequence in the original version of the data file necessary to generate the data chunk sequence in the updated version of the data file at step 924. In other words, the data chunk comparator 214 determines the specific data chunk additions and/or deletions necessary to update the original version of the data file to the updated version of the data file. The data chunk comparator 214 generates a data update schedule detailing the identified data chunk modifications at step 926. The data update schedule is forwarded to the data update scheduler 216.

The RF power coupling between the reader/writer 116 and the flash memory device 104 is reestablished at step 928 and the contactless communication channel is reestablished between the reader/writer 116 and the flash memory device 104 at step 930. The data update scheduler 216 performs the data chunk modifications to the original version of the data file stored on the flash memory 114 in accordance with the data update schedule thereby updating the data file stored on the flash memory device 104 from the original version of the data file to the updated version of the data file at step 932.

The performance of each of the data chunk modifications detailed in the data update schedule is logged at the host device 102 as the data chunk modification is completed. In the event, the RF link is temporarily disconnected, the data update scheduler 216 can resume implementation of the remaining data chunk modification updates once the contactless communication channel between the reader/writer 116 and the flash memory device 104 is reestablished. It should be noted that while the steps in the method 900 have been described in a particular order, performing one or more of the steps in a different order are also considered to be within the scope of the invention.

In one embodiment, a computer readable medium is used to store a computer program for updating a data file stored on the flash memory device 104. The computer readable medium includes computer readable code for issuing a command to the host unit 100 to power the flash memory device 104 via an RF field generated by the host unit 100, and computer readable code for establishing a contactless communication channel between the flash memory device 104 and the host unit 100. The computer readable medium further includes computer readable code for downloading a first version of a data file from the flash memory device 104 to the host unit 100 via the contactless communication channel. The first version of the data file includes a first plurality of data chunks. The computer readable medium also includes computer readable code for generating a second version of the data file at the host unit 100. The second version of the data file includes a second plurality of data chunks. The computer readable medium includes computer readable code for identifying at least one data chunk modification to the first plurality of data chunks necessary to generate the second plurality of data chunks at the host unit 100, computer readable code for reestablishing the contactless communication channel between the flash memory device 104 and the host unit 100 responsive to the completion of the identification of the at least one data chunk modification to the first plurality of data chunks necessary to generate the second plurality of data chunks, and computer readable code for issuing a command to perform the at least one data chunk modification to the first plurality of data chunks stored on the flash memory device 104 from the host unit 100 to the flash memory device 104 thereby updating the first version of the data file stored on the flash memory device 104 to the second version of the data file.

While the embodiments of the invention disclosed herein are presently considered to be preferred, various changes, and modifications can be made without departing from the spirit and scope of the invention. The scope of the invention is indicated in the appended claims, and all changes that come within the meaning and range of equivalents are intended to be embraced therein.

What is claimed is:

1. A method of updating a data file stored on a flash memory device via a contactless communication channel, the method comprising:

powering a flash memory device via an RF field generated by a host unit;

establishing a contactless communication channel between the flash memory device and the host unit;

downloading a first version of a data file from the flash memory device to the host unit via the contactless communication channel, the first version of the data file comprising a first plurality of data chunks;

generating a second version of the data file at the host unit, the second version of the data file comprising a second plurality of data chunks;

identifying at least one data chunk modification to the first plurality of data chunks necessary to generate the second plurality of data chunks at the host unit;

reestablishing the contactless communication channel between the flash memory device and the host unit responsive to the completion of the identification of the at least one data chunk modification to the first plurality of data chunks necessary to generate the second plurality of data chunks; and performing the at least one data chunk modification to the first plurality of data chunks stored on the flash memory device thereby updating the first version of the data file stored on the flash memory device to the second version of the data file.

2. The method of claim 1, wherein performing the at least one data chunk modification comprises deleting at least one of the first plurality of data chunks stored on the flash memory device.

3. The method of claim 1, wherein performing the at least one data chunk modification comprises adding at least one of the second plurality of data chunks to the first plurality of data chunks stored on the flash memory device.

4. The method of claim 1, wherein identifying the at least one data chunk modification to the first plurality of data chunks necessary to generated the second plurality of data chunks at the host unit further comprises:

generating a first plurality of digital signatures at the host unit, each of the first plurality of digital signatures being associated with a corresponding one of the first plurality of data chunks;

generating a second plurality of digital signatures at the host unit, each of the second plurality of digital signatures being associated with a corresponding one of the second plurality of data chunks; and comparing the first plurality of digital signatures with the second plurality of digital signatures at the host unit to determine whether the at least one data modification of the first plurality of data chunks is necessary to generate the second plurality of data chunks.

5. The method of claim 4, wherein generating a first plurality of digital signatures comprises generating a first plurality of hash values of the first plurality of data chunks and generating a second plurality of digital signatures comprises generating a second plurality of hash values of the second plurality of data chunks.

6. The method of claim 1, wherein generating a second version of the data file comprises converting a hierarchical data structure of the second version of the data file into a serialized data byte sequence at the host unit.

7. The method of claim 6, further comprising dividing the serialized data byte sequence of the second version of the data file into a plurality of consecutive variable length data chunks at the host unit.

8. The method of claim 1, wherein downloading a first version of a data file from a flash memory device to the host unit comprises:

downloading a data file record for the first version of the data file, the data file record comprising a data file name, a data file attribute, a number of data chunks in the first plurality of data chunks, and a first plurality of data chunk record pointers, where each of the first plurality of data chunk record pointers points to a storage location of a corresponding one of a first plurality of data chunk records in the flash memory device;

downloading the first plurality of data chunk records, each of the first plurality of data chunk records corresponding to one of the first plurality of data chunks, where a first data chunk record indicates a first data chunk size, and first and second data block pointers pointing to respective first and second locations of first and second blocks of data in the flash memory device, where the first data chunk comprises the first and second blocks of data; and downloading the first and second blocks of data.

9. The method of claim 1, further comprising logging the performance of each of the at least one data chunk modifications to the first plurality of data chunks stored on the flash memory device at the host unit.

10. The method of claim 1, further comprising downloading an entire data content of the flash memory device to the host unit via the contactless communication channel.

11. The method of claim 1, further comprising reconstructing an original data structure of the first version of the data file downloaded from the flash memory device to the host unit, the first version of the downloaded data file having a serialized data byte sequence format.

12. The method of claim 1, wherein downloading a first version of a data file from the flash memory device to the host unit comprises:

downloading a data file record for the first version of the data file, the data file record comprising a data file name, a data file attribute, and a first plurality of digital signatures, where each of the first plurality of digital signatures is associated with a corresponding one of the first plurality of data chunks; and downloading a first plurality of data chunk files, each of the first plurality of data chunk files comprising a corresponding one of the first plurality of data chunks.

13. A computer readable medium for storing a computer program for updating a data file stored on a flash memory device comprising:

computer readable code for issuing a command to a host unit to power a flash memory device via an RF field generated by the host unit;

computer readable code for establishing a contactless communication channel between the flash memory device and the host unit;

computer readable code for downloading a first version of a data file from the flash memory device to the host unit via the contactless communication channel, the first version of the data file comprising a first plurality of data chunks;

computer readable code for generating a second version of the data file at the host unit, the second version of the data file comprising a second plurality of data chunks;

computer readable code for identifying at least one data chunk modification to the first plurality of data chunks necessary to generate the second plurality of data chunks at the host unit;

computer readable code for reestablishing the contactless communication channel between the flash memory device and the host unit responsive to the completion of the identification of the at least one data chunk modification to the first plurality of data chunks necessary to generate the second plurality of data chunks; and computer readable code for issuing a command to perform the at least one data chunk modification to the first plurality of data chunks stored on the flash memory device from the host unit to the flash memory device thereby updating the first version of the data file stored on the flash memory device to the second version of the data file.

14. The computer readable medium of claim 13, wherein the computer readable code for issuing a command to perform the at least one data chunk modification comprises computer readable code for issuing a command to delete at least one of the first plurality of data chunks stored on the flash memory device.

15. The computer readable medium of claim 13, wherein the computer readable code for issuing a command to perform the at least one data chunk modification comprises computer readable code for issuing a command to add one of the second plurality of data chunks to the first plurality of data chunks stored on the flash memory device.

16. The computer readable medium of claim 13, wherein the computer readable code for identifying the at least one data chunk modification to the first plurality of data chunks necessary to generated the second plurality of data chunks at the host unit further comprises:

computer readable code for generating a first plurality of digital signatures at the host unit, each of the first plurality of digital signatures being associated with a corresponding one of the first plurality of data chunks;

computer readable code for generating a second plurality of digital signatures at the host unit, each of the second plurality of digital signatures being associated with a corresponding one of the second plurality of data chunks; and computer readable code for comparing the first plurality of digital signatures with the second plurality of digital signatures at the host unit to determine whether the at least one data modification to the first plurality of data chunks is necessary to generate the second plurality of data chunks.

17. The computer readable medium of claim 16, wherein the computer readable code for generating a first plurality of digital signatures comprises computer readable code for generating a first plurality of hash values of the first plurality of data chunks and the computer readable code for generating a second plurality of digital signatures comprises computer readable code for generating a second plurality of hash values of the second plurality of data chunks.

18. The computer readable medium of claim 13, wherein the computer readable code for generating a second version of the data file comprises computer readable code for converting a hierarchical data structure of the second version of the data file into a serialized data byte sequence at the host unit.

19. The computer readable medium of claim 18, further comprising computer readable code for dividing the serialized data byte sequence of the second version of the data file into a plurality of consecutive variable length data chunks at the host unit.

20. The computer readable medium of claim 13, wherein the computer readable code for downloading a first version of a data file from a flash memory device to the host unit comprises:

computer readable code for downloading a data file record for the first version of the data file, the data file record comprising a data file name, a data file attribute, a number of data chunks in the first plurality of data chunks, and a first plurality of data chunk record pointers, where each of the first plurality of data chunk record pointers points to a storage location of a corresponding one of a first plurality of data chunk records in the flash memory device;

computer readable code for downloading the first plurality of data chunk records, each of the first plurality of data chunk records corresponding to one of the first plurality of data chunks, where a first data chunk record indicates a first data chunk size, and first and second data block pointers pointing to respective first and second locations of first and second blocks of data in the flash memory device, where the first data chunk comprises the first and second blocks of data; and computer readable code for downloading the first and second blocks of data.

21. The computer readable medium of claim 13, further comprising computer readable code for logging the performance of each of the at least one data chunk modifications to the first plurality of data chunks stored on the flash memory device at the host unit.

22. The computer readable medium of claim 13, further comprising computer readable code for downloading an entire data content of the flash memory device to the host unit via the contactless communication channel.

23. The computer readable medium of claim 13, further comprising computer readable code for reconstructing an original data structure of the first version of the data file downloaded from the flash memory device to the host unit, the first version of the downloaded data file having a serialized data byte sequence format.

24. The computer readable medium of claim 13, wherein the computer readable code for downloading a first version of a data file from the flash memory device to the host unit comprises:

computer readable code for downloading a data file record for the first version of the data file, the data file record comprising a data file name, a data file attribute, and a first plurality of digital signatures, where each of the first plurality of digital signatures is associated with a corresponding one of the first plurality of data chunks; and computer readable code for downloading a first plurality of data chunk files, each of the first plurality of data chunk files comprising a corresponding one of the first plurality of data chunks.

25. A system for updating a data file stored on a flash memory device, the method comprising:

means for powering a flash memory device via an RF field generated by a host unit;

means for establishing a contactless communication channel between the flash memory device and the host unit;

means for downloading a first version of a data file from the flash memory device to the host unit via the contactless communication channel, the first version of the data file comprising a first plurality of data chunks;

means for generating a second version of the data file at the host unit, the second version of the data file comprising a second plurality of data chunks;

means for identifying at least one data chunk modification to the first plurality of data chunks necessary to generate the second plurality of data chunks at the host unit;

means for reestablishing the contactless communication channel between the flash memory device and the host unit responsive to the completion of the identification of the at least one data chunk modification to the first plurality of data chunks necessary to generate the second plurality of data chunks; and means for performing the at least one data chunk modification to the first plurality of data chunks stored on the flash memory device thereby updating the first version of the data file stored on the flash memory device to the second version of the data file.

* * * * *

UNITED STATES PATENT AND TRADEMARK OFFICE
CERTIFICATE OF CORRECTION

PATENT NO. : 7,753,281 B2  Page 1 of 1
APPLICATION NO. : 11/444922
DATED : July 13, 2010
INVENTOR(S) : Jun Li et al.

It is certified that error appears in the above-identified patent and that said Letters Patent is hereby corrected as shown below:

In column 15, line 45, in Claim 4, delete "generated" and insert -- generate --, therefor.

In column 16, line 21, in Claim 8, delete "indicates" and insert -- includes --, therefor.

In column 17, line 33, in Claim 16, delete "generated" and insert -- generate --, therefor.

In column 18, line 17, in Claim 20, delete "indicates" and insert -- includes --, therefor.

Signed and Sealed this

Ninth Day of November, 2010

David J. Kappos
*Director of the United States Patent and Trademark Office*